(12) United States Patent
Shouji

(10) Patent No.: US 6,742,898 B2
(45) Date of Patent: Jun. 1, 2004

(54) PROJECTOR DEVICE

(75) Inventor: Eisaku Shouji, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/454,627

(22) Filed: Jun. 5, 2003

(65) Prior Publication Data

US 2003/0227598 A1 Dec. 11, 2003

(30) Foreign Application Priority Data

Jun. 7, 2002 (JP) ........................................ 2002/166685
Dec. 18, 2002 (JP) ........................................ 2002/367321

(51) Int. Cl.$^7$ ............................................. G03B 21/14
(52) U.S. Cl. ................................ 353/31; 353/94; 349/8; 349/9
(58) Field of Search ........................... 353/20, 30, 31, 353/37, 48, 94, 85; 349/5, 8, 9; 348/750, 751; 359/618; 362/209, 210, 244, 247; 352/41, 198, 203

(56) References Cited

U.S. PATENT DOCUMENTS

| | | | |
|---|---|---|---|
| 5,883,681 A * | 3/1999 | Kono et al. | 348/751 |
| 6,075,648 A * | 6/2000 | Yamamoto et al. | 359/619 |
| 6,222,674 B1 * | 4/2001 | Ohta | 359/618 |
| 6,224,217 B1 * | 5/2001 | Tanaka | 353/94 |
| 6,336,724 B1 * | 1/2002 | Shouji et al. | 353/20 |
| 6,431,727 B1 * | 8/2002 | Sugawara et al. | 362/244 |
| 2002/0036904 A1 | 3/2002 | Kawashima et al. | |

FOREIGN PATENT DOCUMENTS

| | | |
|---|---|---|
| EP | 0552725 A1 | 7/1993 |
| EP | 1115255 A1 | 7/2001 |
| JP | 08304753 | 11/1996 |
| JP | 11096803 | 4/1999 |
| JP | 11160655 | 6/1999 |
| JP | 2002341291 | 11/2002 |

\* cited by examiner

*Primary Examiner*—Rodney Fuller
*Assistant Examiner*—Michael Dalakis
(74) *Attorney, Agent, or Firm*—Sughrue Mion, PLLC

(57) ABSTRACT

In a projector device, a plurality of light source each including a lamp and a reflection mirror are arranged in parallel in an opposing relation to each other with optical axes thereof being offset such that light fluxes from the light sources are compressed in the offset direction, respectively. The compressed light fluxes are reflected at right angles by orthogonal reflecting surfaces of a reflection member including reflection mirrors or reflection prisms to form a plurality of parallel emitting lights in one direction. The projector device includes a condenser portion for condensing the parallel emitting lights to a single emitting light flux. The light fluxes from the light sources are passed through a polarizer portion before the incidence on the reflection member or after the emission from the reflection member such that the light fluxes become linear polarized lights having polarizing directions coincident with polarizing directions of liquid crystal panels. The single emitting light flux is decomposed to a red, green and blue color lights by an image forming portion and the red, green and blue color lights pass through the liquid crystal panels to spatially modulate the red, green and blue color lights to thereby form red, green and blue image lights. The red, green and blue image lights are synthesized to form a color image light, which is projected onto a screen by a projection lens.

12 Claims, 9 Drawing Sheets

PROJECTOR DEVICE

BACKGROUND OF THE INVENTION

1. Field of the Invention

The present invention relates to a projector device and, in particular, the present invention relates to a projector device equipped with a plurality of light sources.

2. Description of the Prior Art

The projector device using liquid crystal panels is well known. In such projector device, a single, large size lamp is usually used as a light source.

FIG. 9 shows an example of a conventional projector device using liquid crystal panels. As shown in FIG. 9, the projector device includes a lamp 101, a reflection mirror 102, an integrator 103, a polarizer portion 104, a field lens 105, dichroic mirrors 106 and 107, liquid crystal panels 108R, 108G and 108B, a cross dichroic prism 109 and a projection lens 110.

In the conventional projector device shown in FIG. 9, light emitted from the lamp 101, which is a high power, large size lamp, is reflected by the reflection mirror 102 as parallel light fluxes. The parallel light fluxes are incident on the integrator 103 in which luminance of a center portion and of a peripheral portion of the parallel light fluxes is averaged. The averaged light from the integrator 103 is converted into linear polarized light corresponding to transmission characteristics of the liquid crystal panels 108R, 108G and 108B by the polarizer portion 104 and then converted into parallel light fluxes having a predetermined diameter by the field lens 105.

The parallel light fluxes from the field lens 105 is incident on the dichroic mirror 106. Only red color light portion thereof is allowed to transmit the dichroic mirror 106 and other color light portions having other colors are reflected thereby. The red color light transmitted through the dichroic mirror 106 passes through the liquid crystal panel 108R, which transmits red color light corresponding to brightness of portions of an image, resulting in a red color image light.

Further, the other color lights reflected by the dichroic mirror 106 are incident on the dichroic mirror 107 and a green color light portion thereof is reflected thereby and a blue color light transmits therethrough. The green color light reflected by the dichroic mirror 107 passes through the liquid crystal panel 108G, which transmits a green color light corresponding to brightness of portions of an image, resulting in a green color image light.

The blue color light transmitted through the dichroic mirror 107 passes through the liquid crystal panel 108B, which transmits a blue color light corresponding to brightness of portions of an image, resulting in a blue color image light.

The red color image light obtained by the liquid crystal panel 108R, the green color image light obtained by the liquid crystal panel 108G and the blue color image light obtained by the liquid crystal panel 108B are synthesized by the cross dichroic prism 109, resulting in a color image light. The thus produced color image light is enlarged by the projection lens 110 and projected onto a screen 111.

In the conventional projector device, the single, large lamp is used as the light source as shown in FIG. 9.

This is because, in order to obtain a high luminance image by the projector device, it is necessary to increase the output power of the light source.

However, when such large lamp is used, a large space is necessary, so that a reduction of size of the projector device is difficult. Further, since an amount of heat generated by the lamp is considerable, special consideration for heat sink is indispensable.

SUMMARY OF THE INVENTION

Accordingly, an object of the present invention is to provide a projector device capable of obtaining high luminance without requiring a large light source.

The projector device according to the present invention includes a plurality of light sources having parallel optical axes offset in a direction perpendicular to the optical axis direction and an optical member for compressing light fluxes emitted from the light sources in the offset direction. The projector device further includes a reflector portion for reflecting the light fluxes from the light sources and directing the reflected light fluxes in one direction. The reflected light fluxes are emitted through a condenser portion as a single light. The single light flux is incident on an image forming portion. In the image forming portion, the single light flux is separated to a plurality of color light fluxes and the color light fluxes pass through spacial modulator elements, which spatially modulate the color light fluxes correspondingly to respective color images to form image lights of respective colors. And then, the color image light fluxes are synthesized to form a color image. The color image formed in the image forming portion is projected onto a screen by a projector portion including a projection lens, etc.

In the above mentioned projector device, the reflector portion includes a pair of flat reflection mirrors or a pair of reflection prisms, which are juxtaposed such that reflecting surfaces of the flat reflection mirrors or the reflection prisms are orthogonal to each other and light fluxes from the light sources are reflected by the reflection surfaces of the reflection mirrors or the reflection prisms at right angles, respectively, to form parallel light fluxes.

When the reflection mirrors are employed, it is preferable that the mirrors are cold mirrors, which reflect visible light while transmitting infra-red light.

As the optical member for compressing light fluxes in the offset direction, a cylindrical lens is preferable.

The condenser portion preferably includes a concave lens for diverging the compressed light fluxes from the reflector portion and a pair of integrators for averaging amounts of lights from center portions and peripheral portions of the light fluxes from the concave lens.

Alternatively, the optical member for compressing light in the offset direction may have a function of averaging amounts of lights from a center portion and a peripheral portion of the light flux from the concave lens as well. In such case, it is preferable that a polarizer portion is provided between the optical member and the reflector portion.

In the above mentioned projector device, each of the light sources is constructed with a lamp and a reflection mirror and the light sources are arranged in an offset relation such that optical axes thereof are parallel to each other. It is practical that the spacial modulator elements are liquid crystal panels, respectively. Extra-high pressure mercury lamps are suitable for the lamps. Further, the projection lens constituting the projector portion preferably has a zooming function.

Particularly, the projector device according to the present invention is featured by that the optical member for compressing the lights in the offset direction is constructed with a cylindrical lens, the reflection member is composed of a pair of reflection mirrors or reflection prisms having reflecting surfaces orthogonal to each other so that the light fluxes from the light sources are reflected at right angles by the reflection surfaces to form parallel light fluxes, the condenser portion unifies polarizing directions of a plurality of incident lights to form a single emitting light including linear-polarized lights coincident with polarizing directions of the liquid crystal panels and the image light forming member decomposes the light emitted from the condenser member to a red, green and blue color lights and produces a color image light by passing the decomposed color lights through the liquid crystal panels and the projection member for projecting the color image light is a projection lens.

In another embodiment of the projector device according to the present invention, the condenser member includes a first and second integrators for unifying the lights from the light sources, compressing the lights in the offset direction and converting them into linear polarized lights coincident with the polarizing directions of said liquid crystal panels, the reflection member is composed of a pair of reflection mirrors or reflection prisms having reflecting surfaces orthogonal to each other so that the light fluxes from the light sources are reflected at right angles by the reflection surfaces to form parallel light fluxes in one direction, the condenser portion unifies polarizing directions of a plurality of incident lights to form a single emitting light including linear polarized lights coincident with polarizing directions of the liquid crystal panels and the image light forming member decomposes the light emitted from the condenser member to a red, green and blue color lights and produces a color image light by passing the decomposed color lights through the liquid crystal panels, respectively, and the projection member for projecting the color image light is a projection lens.

DETAILED DESCRIPTION OF THE PREFERRED EMBODIMENTS

Preferred embodiments of the present invention will be described with reference to the accompanying drawings.

First Embodiment

Figure 1:
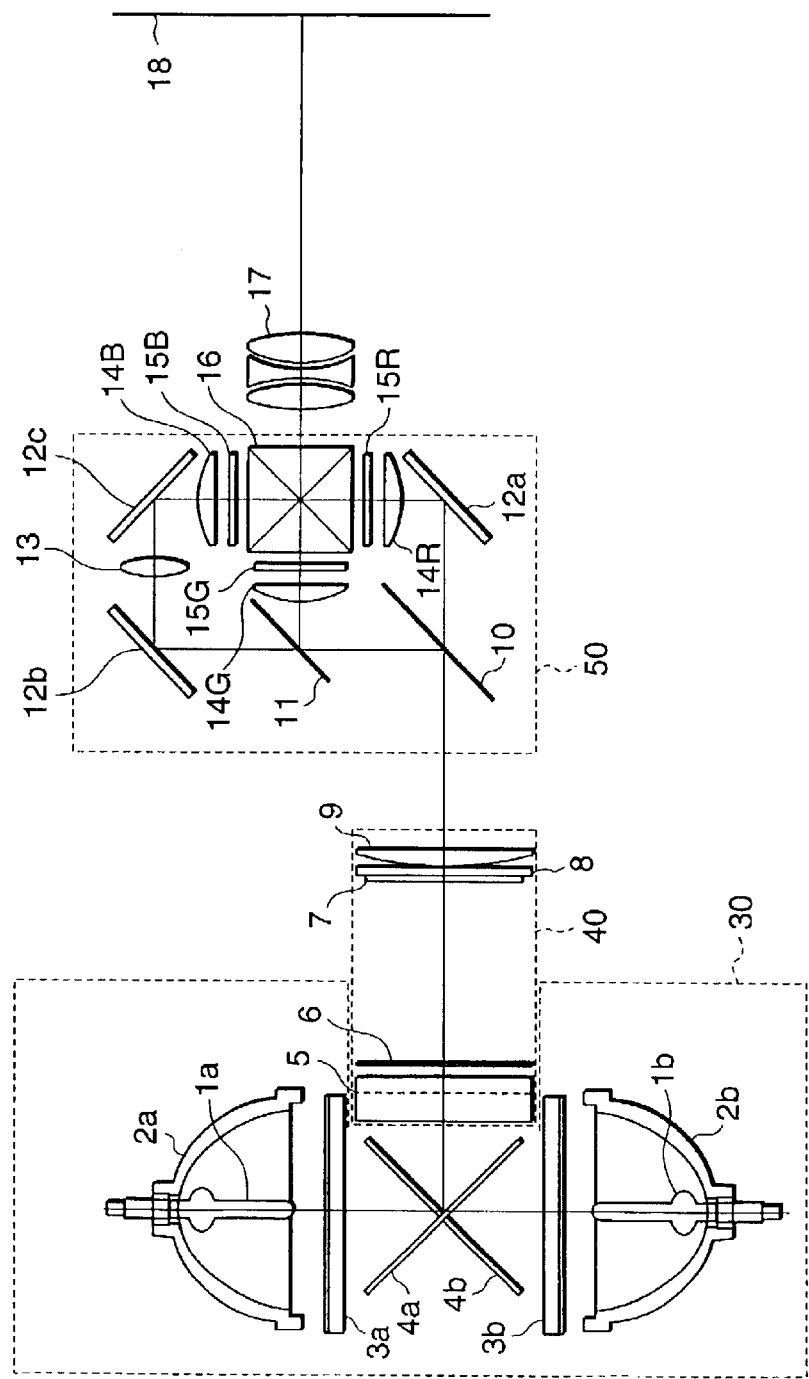
FIG. 1 shows a construction of a projector device according to a first embodiment of the present invention.

FIG. 1 shows a projector device according to a first embodiment of the present invention. As shown in FIG. 1, the projector device is constructed with lamps 1a and 1b, reflection mirrors 2a and 2b, cylindrical lenses 3a and 3b having ellipsoidal cross sections, respectively, reflection mirrors 4a and 4b, a cylindrical lens 5 having an ellipsoidal cross section, integrators 6 and 7, a polarizer 8, a field lens 9, dichroic mirrors 10 and 11, flat mirrors 12a, 12b and 12c, a field lens 13, condenser lenses 14R, 14G and 14B, liquid crystal panels 15R, 15G and 15B, a cross dichroic prism 16 and a projection lens 17.

The lamp 1a and the reflection mirror 2a constitute an upper light source and the lamp 1b and the reflection mirror 2b constitute a lower light source. Further, the lamps 1a and 1b, the reflection mirrors 2a and 2b, the cylindrical lenses 3a and 3b and the reflection mirrors 4a and 4b constitute a light source portion 30 and the cylindrical lens 5, the integrators 6 and 7, the polarizer 8 and the field lens 9 constitute a condenser portion 40. An image forming portion 50 is constructed with the dichroic mirrors 10 and 11, the flat mirrors 12a and 12b, the field lens 13, the condenser lenses 14R, 14G and 14B, the liquid crystal panels 15R, 15G and 15B and the cross dichroic prism 16.

Each of the lamps 1a and 1b of the light source portion 30 is a small size, extra-high pressure mercury lamp, for example. Each of the reflection mirrors 2a and 2b is a parabolic mirror and the parabolic mirrors convert light emitted from the respective lamps 1a and 1b into parallel lights.

Each of the cylindrical lenses 3a and 3b has an ellipsoidal cross section input side of which is an aspherical convex surface for converging incident light in a minor axis direction of the ellipsoidal cross section and emitting the converged light. The reflection mirrors 4a and 4b are flat mirrors juxtaposed in a perpendicular direction to the drawing sheet and arranged orthogonally to each other. The reflection mirrors 4a and 4b reflect light fluxes from the cylindrical lenses 3a and 3b at right angles, respectively, and have the function of cold mirrors for preventing infrared light from being reflected.

In the condenser portion 40, the cylindrical lens 5 is a plate-like lens having one surface, which is an aspherical concave surface, and functions to diverge an incident light in directions orthogonal to an axis of the concave surface thereof. The integrators 6 and 7 are transparent plates each having a surface formed with a number of rectangular micro lenses. Each integrator functions to average luminous intensity of incident light transmitting a center portion and a peripheral portion of the integrator as well as to reduce loss of luminous intensity of light incident on the polarizer 8 by making light fluxes having averaged luminous intensity parallel.

The polarizer 8 linearly polarizes the incident light in a specific direction. The field lens 9 collimates the incident light from the polarizer 8 parallel light fluxes and directs the parallel light fluxes to the dichroic mirror 10 of the image forming portion 50.

In the image forming portion 50, the dichroic mirror 10 functions to transmit a red color light of the incident light and reflect other color lights. The dichroic mirror 11 reflects a green color light of the incident light from the dichroic mirror 10 and transmits a blue color light thereof.

The flat mirror 12a reflects the red color light from the dichroic mirror 10 to the condenser lens 14R. The flat mirror 12b reflects the blue color light from the dichroic mirror 11 to the field lens 13. The flat mirror 12c reflects the blue color light from the field lens 13 to the condenser lens 14B.

The field lens 13 condenses the blue color light from the flat mirror 12b and directs it to the flat mirror 12c. The condenser lens 14R condenses the red color light from the flat mirror 12a and directs it to the liquid crystal panel 15R. The condenser lens 14G condenses the green color light from the dichroic mirror 11 to the liquid crystal panel 15G. The condenser lens 14B condenses the blue color light from the flat mirror 12c to the liquid crystal panel 15B.

Each of the liquid crystal panels 15R, 15G and 15B has a function of spatially modulating input light for every pixel thereof according to an input signal thereto. The liquid crystal panel 15R transmits the red color light from the condenser lens 14R according to luminosity of a red color image. The liquid crystal panel 15G transmits the green color light from the condenser lens 14G according to luminosity of a green color image. The liquid crystal panel 15B transmits the blue color light from the condenser lens 14B according to luminosity of a blue color image.

The cross dichroic prism 16 produces a color image light by synthesizing the red, green and blue image lights from the liquid crystal panels 15R, 15G and 15B.

The projection lens 17 enlarges the color image light from the cross dichroic prism 16 and projects it on the screen 18. The screen 18 is provided as a white reflecting plane and displays the color image from the projection lens 17.

Figure 2:
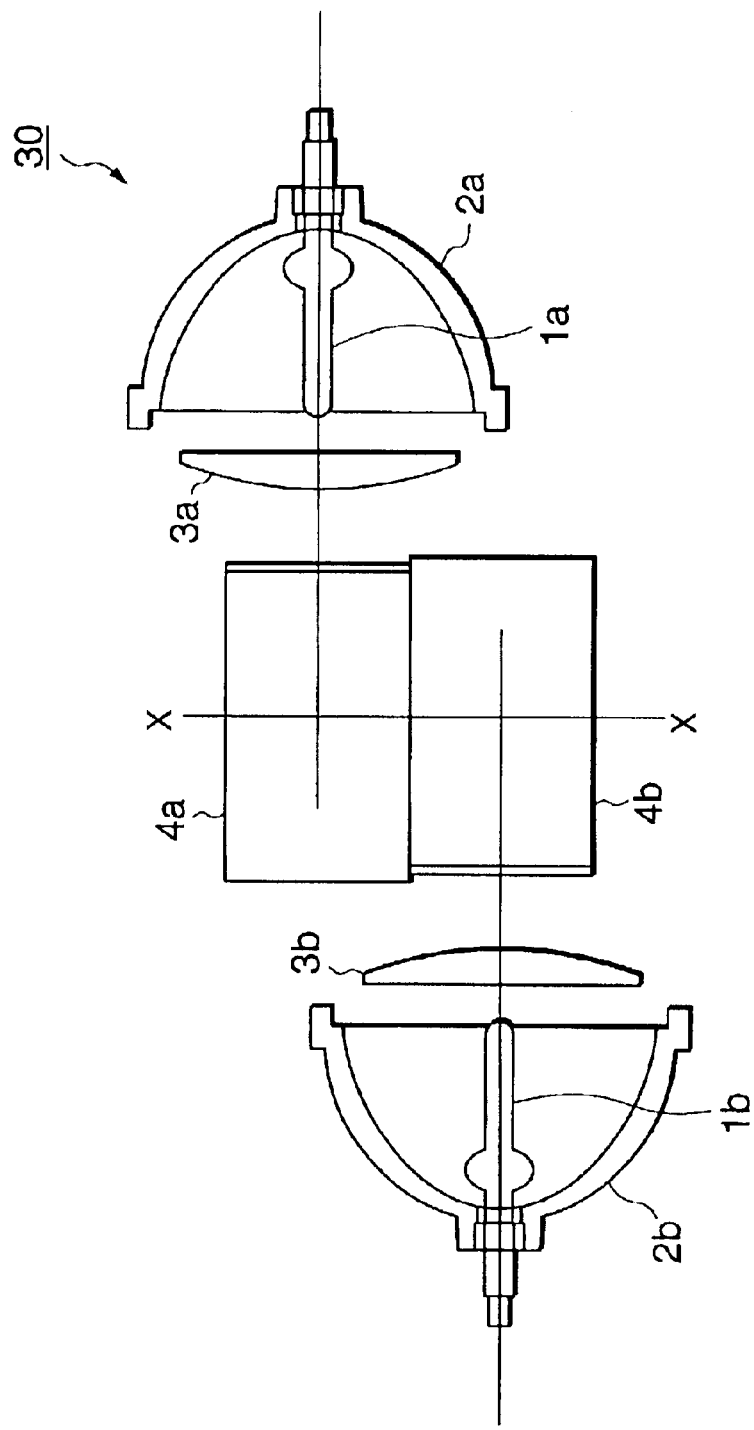
FIG. 2 shows an arrangement of light sources and reflection mirrors in the projector device shown in FIG. 1.

FIG. 2 is a side view of the projector device shown in FIG. 1, showing, in detail, the arrangement of the light sources and the reflection mirrors of the light source portion 30.

As shown in FIG. 2, the light source portion 30 has an offset structure in a vertical direction (X-X direction in FIG. 2) in which the lamp 1a, the reflection mirror 2a and the cylindrical lens 3a are constitute the upper portion of the light source portion and the lamp 1b, the reflection mirror 2b and the cylindrical lens 3b are constitute the lower portion of the light source portion. The reflection mirrors 4a and 4b are orthogonally arranged on an center axis X-X such that center axes of the reflection mirrors in longitudinal direction coincide with center axes of the light sources.

Figure 3:
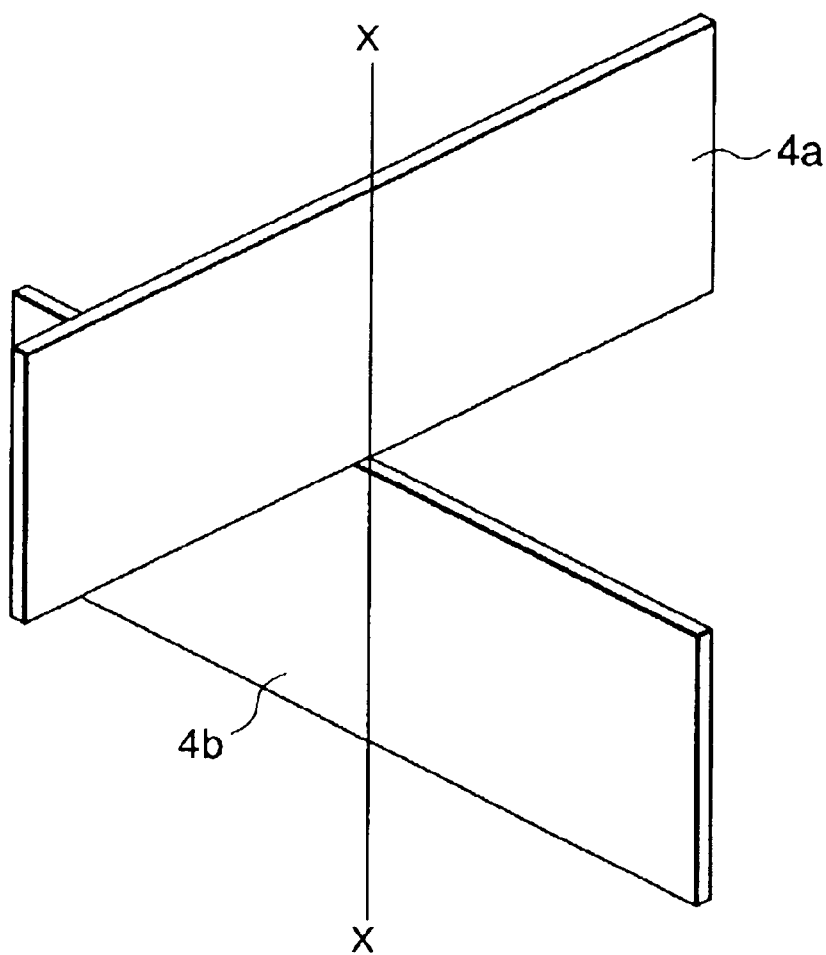
FIG. 3 is a perspective view of the reflection mirrors shown in FIG. 2, showing the arrangement thereof in detail.

FIG. 3 is a perspective view showing the arrangement of the reflection mirrors 4a and 4b shown in FIG. 1 and FIG. 2, in detail.

As shown in FIG. 3, the reflection mirrors 4a and 4b are vertically arranged orthogonally to each other with center axes X-X of the reflection mirrors in shorter side direction coincide with each other. That is, a pair of the flat reflection mirrors are arranged on the axis X-X with reflecting surfaces thereof being orthogonal to each other so that the light fluxes emitted from the respective light sources are reflected at right angles by the respective reflecting surfaces, respectively, to form a parallel light flux.

Incidentally, the reflection mirrors 4a and 4b reflect visible light from the lamps 1a and 1b while transmit infrared light so that heat wave is not transmitted to the succeeding optical system. Therefore, each reflection mirror also has a function of a cold mirror for removing an influence of heat generation by infrared light in the succeeding optical system.

An operation of the projector device according to the first embodiment of the present invention will be described with reference to FIG. 1 to FIG. 3.

After the light fluxes emitted from the lamps 1a and 1b are converted into the parallel light fluxes by the reflection mirrors 4a and 4b, the parallel light fluxes are incident on the cylindrical lenses 3a and 3b, respectively.

One surfaces of the ellipsoidal cross sections of the cylindrical lenses 3a and 3b are convex, respectively, and the cylindrical lenses 31a and 31b are arranged such that minor axis direction of the ellipsoidal cross sections thereof are coincident with the offset direction of the lamps 1a and 1b. Therefore, the light fluxes incident on the cylindrical lenses 3a and 3b are compressed in height direction (X-X direction) of the reflection mirrors 4a and 4b, respectively.

Since the reflection mirrors 4a and 4b are vertically arranged with the reflecting surfaces thereof being orthogonal to each other, the light fluxes reflected by the reflection mirrors 4a and 4b are equally incident on an upper portion and a lower portion of the cylindrical lens 5, respectively.

Further, one surface of the cylindrical lens 5 is concave in cross section. Therefore, the cylindrical lens 5 diverges the light fluxes incident thereon uniformly.

By combining the cylindrical lenses 3a and 3b, the reflection mirrors 4a and 4b and the cylindrical lens 5 as mentioned, the light fluxes emitted from the lamps 1a and 1b are averaged and incident on the integrators 6 and 7 efficiently.

Each of the integrators 6 and 7 includes a transparent flat plate on which a number of minute rectangular convex lenses are formed and has a function of averaging amounts of light incident on a center portion and a peripheral portion of the integrator.

Therefore, the incident light fluxes from the reflection mirrors 4a and 4b are condensed by these convex lenses, so that the light fluxes from the reflection mirrors 4a and 4b are hardly influenced by difference in incident angle between the light fluxes from the reflection mirrors 4a and 4b until the light fluxes reach the dichroic mirrors 10 and 11 and the cross dichroic prism 16. Consequently, color variation of a color image on the screen 18 hardly occurs.

The light flux passed through the integrator 7 is incident on the polarizer 8 in which it is converted into a linear polarized light in a specific direction. This is to make the incident light fluxes on the liquid crystal panels 15R, 15G and 15B in conformity with the characteristics of the liquid crystal panels 15R, 15G and 15B, which efficiently transmit linear polarized lights in specific directions.

The light flux emitted from the polarizer 8 is converted into a parallel light fluxes by the field lens 9 and incident on the dichroic mirror 10. A red color light portion of the parallel light flux is transmitted through the dichroic mirror 10 and the other color light portions are reflected by the dichroic mirror 10. The red color light separated by the dichroic mirror 10 is reflected by the flat mirror 12a, condensed by the condenser lens 14R and incident on the liquid crystal panel 15R.

The green and blue color light portions reflected by the dichroic mirror 10 are incident on the dichroic mirror 11. The green color light portion is reflected by the dichroic mirror 11 and the blue color light portion transmits therethrough. The green color light reflected by the dichroic mirror 11 is condensed by the condenser lens 14G and incident on the liquid crystal panel 15G.

The blue color light transmitted through the dichroic mirror 11 is reflected by the flat mirror 12b and converted into a parallel light flux by the field lens 13. The parallel light flux from the field lens 13 is reflected by the flat mirror 12c, condensed by the condenser lens 14B and incident on the liquid crystal panel 15B.

The liquid crystal panels 15R, 15G and 15B spatially modulate the transmitted light intensities with respect to the respective incident lights in pixel unit correspondingly to the respective red, green and blue light components of the input image signal. Therefore, image lights corresponding to the red, green and blue light components of the input image signal are produced.

The image lights from the respective liquid crystal panels 15R, 15G and 15B are synthesized in color by the cross dichroic prism 16. That is, the cross dichroic prism 16 synthesizes the red image light, the green image light and the blue image light in one and the same direction and emits the synthesized image lights as a color image light.

The color image light from the cross dichroic prism 16 is enlarged by the projection lens 17 and projected onto the screen 18. The projection lens 17 has a function of focus regulation and, therefore, it is possible to display a well focused clear color image on the screen 18.

According to the projector device of the described embodiment, which uses two low power small lamps, it is possible to display an image having luminosity equal to or higher than that obtainable by using a high power large lamp.

Second Embodiment

Figure 4:
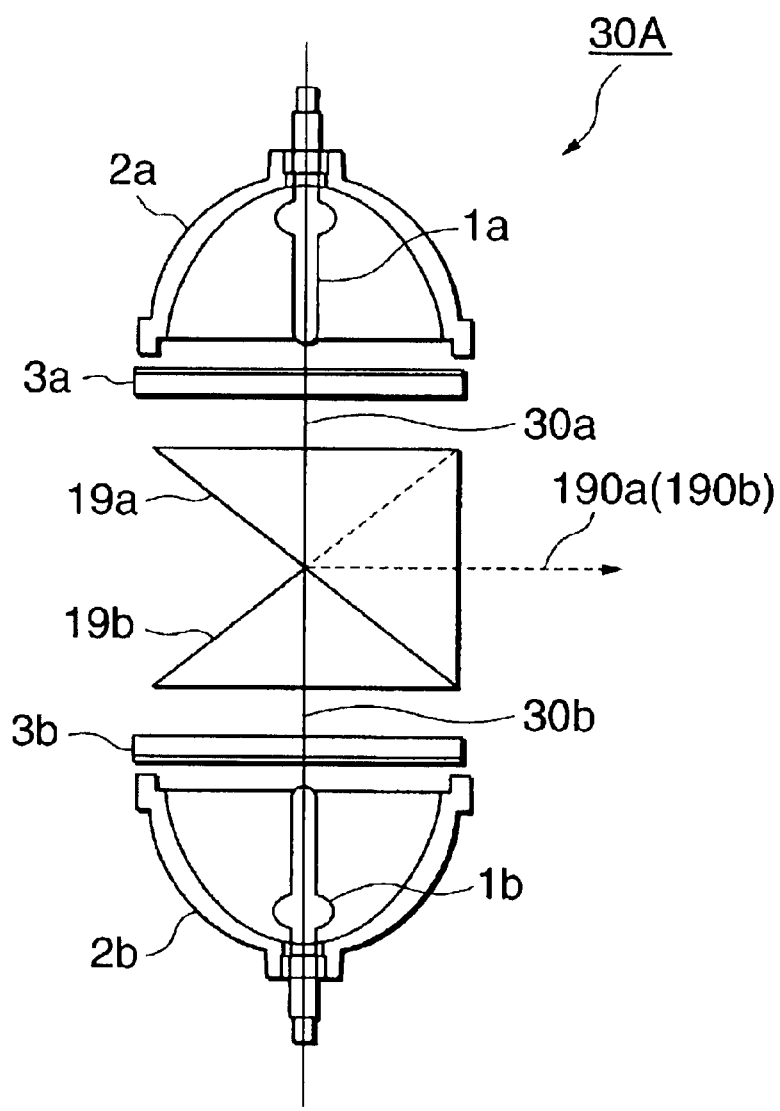
FIG. 4 shows an arrangement of light sources and reflection mirrors in a projector device according to a second embodiment of the present invention.
Figure 5:
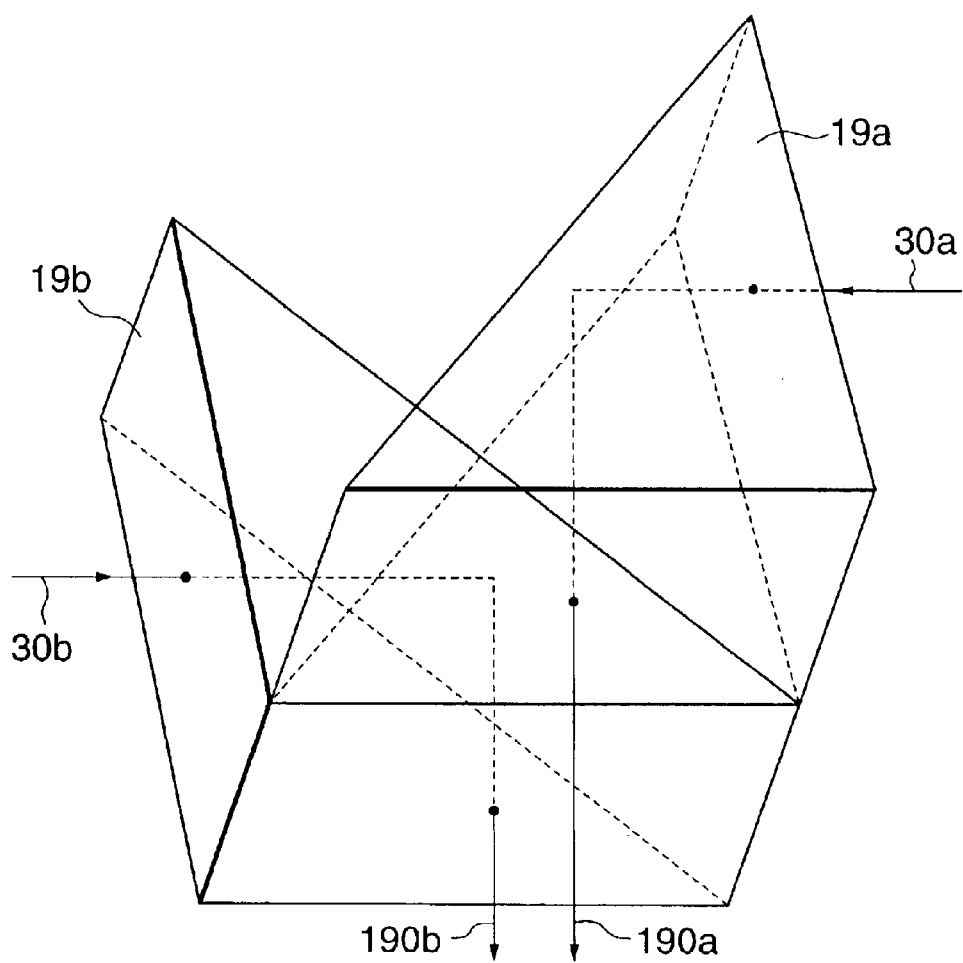
FIG. 5 shows an arrangement of light sources and reflection mirrors in the projector device shown in FIG. 4.

FIG. 4 shows an arrangement of light sources and reflection prisms in a projector device according to a second embodiment of the present invention and FIG. 5 is a detailed perspective view of the reflection prism shown in FIG. 4.

Although only a light source portion 30A is shown in FIG. 4, other portion of the projector device according to the second embodiment, which includes a condenser portion 40, an image forming portion 50 and a projection lens 17, is similar to that in the first embodiment shown in FIG. 1.

The light source portion 30A of the projector device shown in FIG. 4 differs from the first embodiment shown in FIG. 1 in that the reflection prisms 19a and 19b are used in lieu of the reflection mirrors 4a and 4b. Incidentally, since a construction including lamps 1a and 1b, reflection mirrors 2a and 2b and cylindrical lenses 3a and 3b of the second embodiment is similar to that of the first embodiment, detailed description thereof is omitted.

In FIG. 4, the reflection prisms 19a and 19b are arranged correspondingly to the light sources 1a and 1b with an offset in a direction perpendicular to the drawing sheet and a light 30a from the lamp 1a is incident on the prism 19a, reflected by a reflecting plane thereof at an angle of 45° with respect to the incident light and emitted rightward as light flux 190a. A light 30b from the lamp 1b is incident on the prism 19b, reflected by a reflecting plane thereof at an angle of 45° with respect to the incident light and emitted rightward as light flux 190b. The light fluxes 190a and 190b are incident on the condensing portion, which is not shown.

Similarly to the first embodiment, the cylindrical lenses 3a and 3b have ellipsoidal cross sections, input sides of which are aspherical convex surfaces, and are arranged such that minor axis directions of the ellipsoidal cross sections are coincident with the offset direction of the lamps 1a and 1b, respectively. Therefore, the cylindrical lenses 3a and 3b compress the incident light fluxes in height directions of the reflection prisms 19a and 19b and emit the compressed lights.

The thus compressed lights emitted from the reflection prisms 19a and 19b are incident on the cylindrical lens 5 shown in FIG. 1, converted into a single light flux by the integrators 6 and 7 and directed to the subsequent optical system.

FIG. 5 is a perspective view of the reflection prisms 19a and 19b looked down from a right side upper surface of the system shown in FIG. 4, showing the arrangement thereof in detail.

The reflection prisms 19a and 19b are arranged opposite directions and piled up.

According to the projector device of the second embodiment, it is possible to obtain a similar effect to that obtained by the first embodiment.

Third Embodiment

Figure 6:
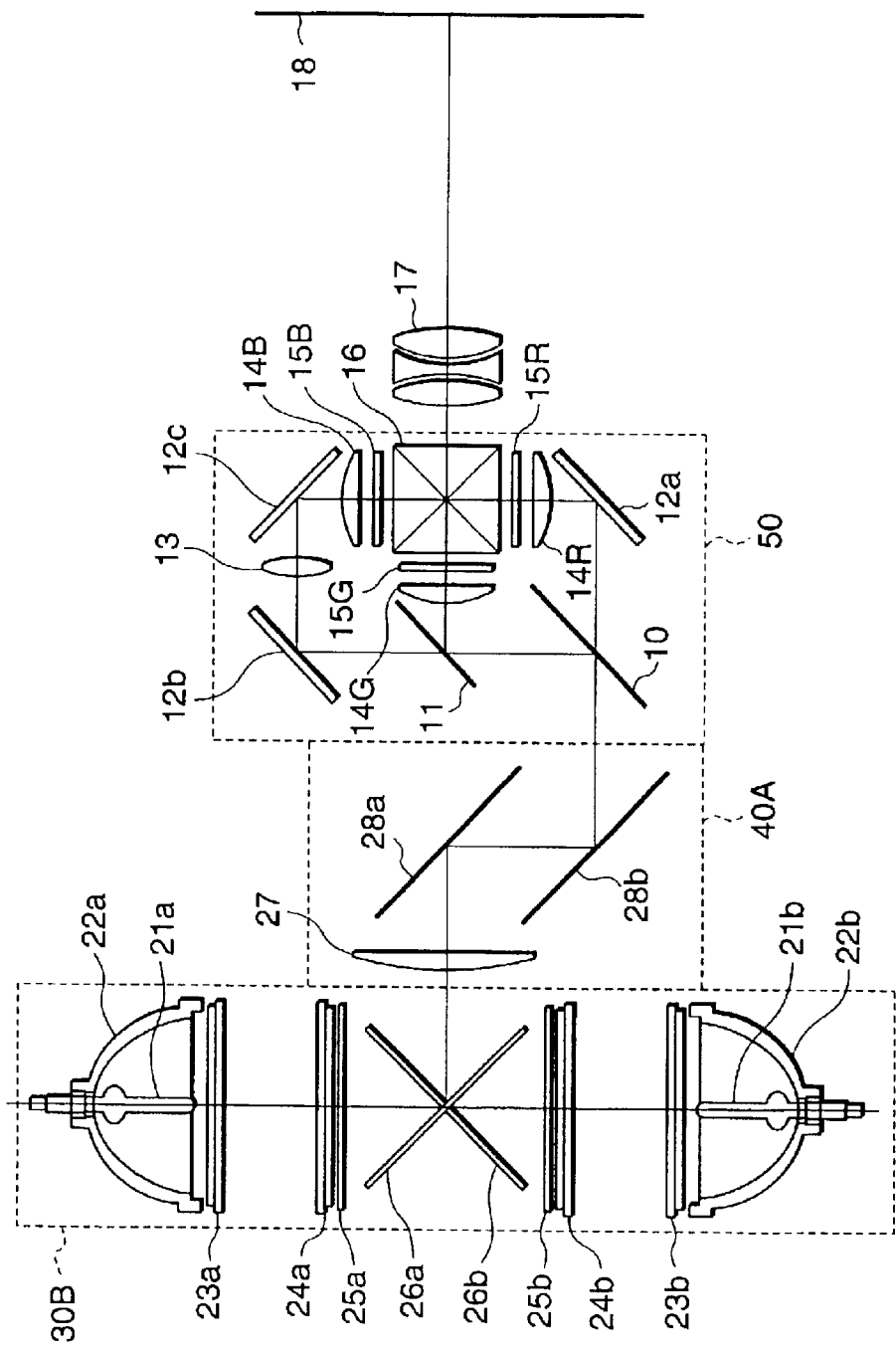
FIG. 6 shows a construction of a projector device according to a third embodiment of the present invention.
Figure 7:
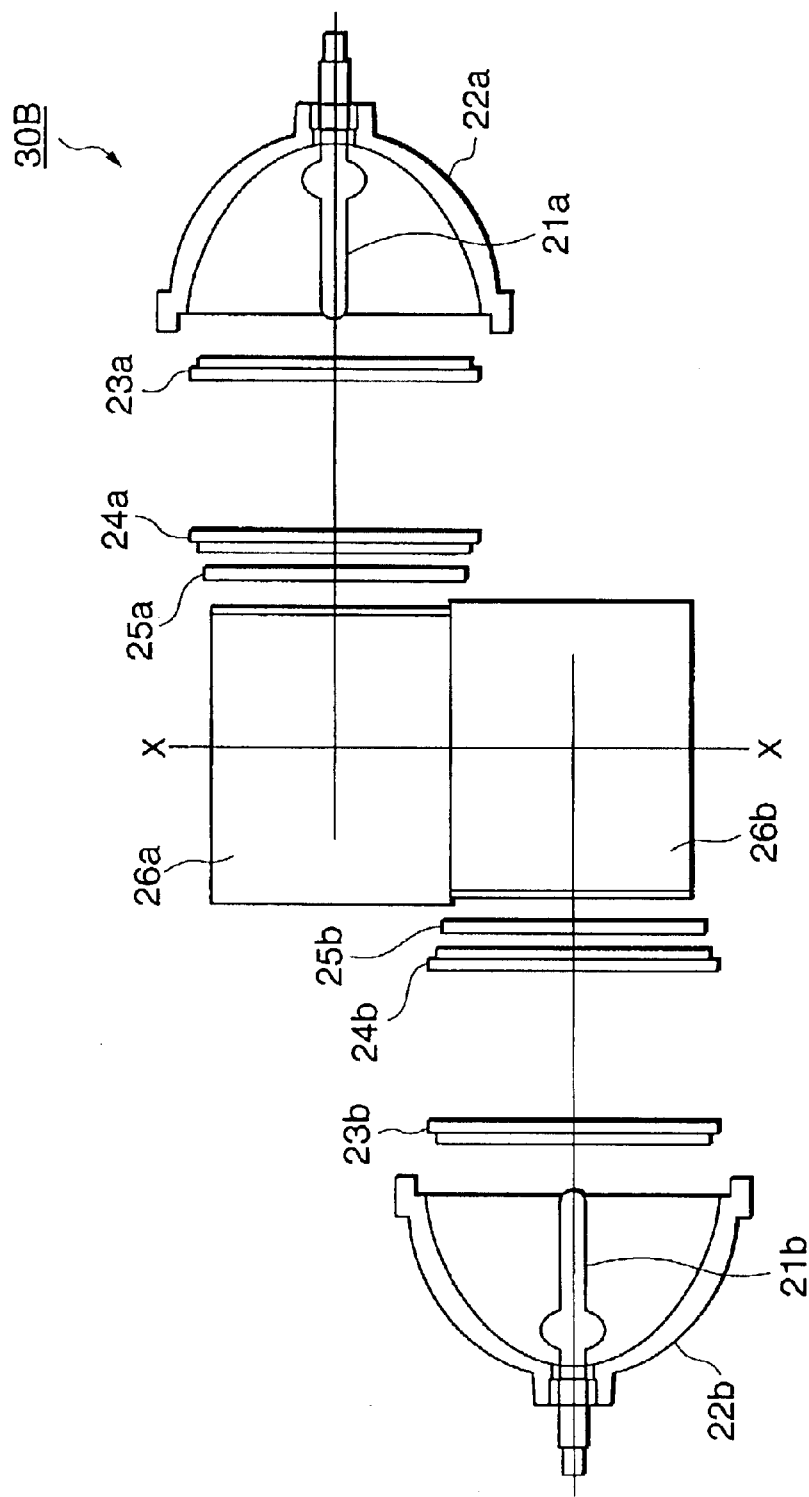
FIG. 7 shows an arrangement of light sources and reflection mirrors in the projector device shown in FIG. 6.

FIG. 6 shows a construction of a projector device according to a third embodiment of the present invention and FIG. 7 is a detailed side view of the reflection prism shown in FIG. 6.

As shown in FIG. 6, the projector device according to the third embodiment of the present invention is constructed with lamps 21a and 21b, reflection mirrors 22a and 22b, integrators 23a and 23b, integrators 24a and 24b, polarizer portions 25a and 25b, reflection mirrors 26a and 26b, a field lens 27, reflection mirrors 28a and 28b, dichroic mirrors 10 and 11, flat mirrors 12a, 12b and 12c, a field lens 13, condenser lenses 14R, 14G and 14B, liquid crystal panels 15R, 15G and 15B, a cross dichroic prism 16 and a projection lens 17.

The lamp 21a and the reflection mirror 22a constitute an upper light source and the lamp 21b and the reflection mirror 22b constitute a lower light source. Further, the lamps 21a and 21b, the reflection mirrors 22a and 22b, the integrators 23a and 23b, the integrators 24a and 24b, the polarizer portions 25a and 25b and the reflection mirrors 26a and 26b constitute a light source portion 30B and the field lens 27 and the reflection mirrors 28a and 28b constitute a condenser portion 40A. An image forming portion 50 is constructed with the dichroic mirrors 10 and 11, the flat mirrors 12a and 12b, the field lens 13, the condenser lenses 14R, 14G and 14B, the liquid crystal panels 15R, 15G and 15B and the cross dichroic prism 16.

Since the image forming portion 50 and the projection lens 17 are the same as those shown in FIG. 1, detailed description thereof is omitted.

In the light source portion 30B, the lamps 21a and 21b may be small size, extra-high pressure mercury lamps. The reflection mirrors 22a and 22b are parabolic mirrors or prolate ellipsoidal mirrors infinitely close to parabolic planes and convert lights emitted from the lamps 21a and 21b into parallel lights, respectively.

Each of the integrators 23a and 24a and the integrators 23b and 24b includes a transparent flat plate on which a number of minute lens elements are formed and, when assembled in an illumination system, has a function of averaging luminous intensities of illuminating light flux. Further, the integrators 23a and 23b have functions of compressing the incident lights to heights corresponding to the reflection mirrors 26a and 26b, respectively.

Each of the polarizer portions 25a and 25b linearly polarizes the incident light in a specific direction. In this case, the polarizer portions 25a and 25b are constructed such that light loss is reduced by registering the lens element arrangement of the integrators 23a and 24a and the integrators 23b and 24b with the pith of strip-like micro structures of the polarizers 25a and 25b.

The reflection mirrors 26a and 26b are flat mirrors juxtaposed in a perpendicular direction to the drawing sheet and have reflecting surfaces arranged orthogonally to each other. The reflection mirrors 26a and 26b reflect light fluxes from the polarizers 25a and 25b at right angles, respectively, and have the function of cold mirrors for preventing infrared light from being reflected.

In the condenser portion 40A, the field lens 27 condense the lights from the reflection mirrors 26a and 26b and emit the condensed lights to the reflection mirror 28a. The reflection mirror 28b reflects the light from the reflection mirror 28a at right angle and the reflected light is incident on the image forming portion 50.

FIG. 7 is a side view of the light source portion 30B shown in FIG. 6, showing a concrete example of the arrangement of the light source and the reflection mirrors.

As shown in FIG. 7, the lamp 21a, the reflection mirror 22a, the integrators 23a and 24a, the polarizer 25a and the reflection mirror 26a are arranged in an upper portion of the light source portion 30B and the lamp 21b, the reflection mirror 22b, the integrators 23b and 24b, the polarizer 25b and the reflection mirror 26b are arranged in a lower portion of the light source portion 30B. The reflection mirrors 26a and 26b are arranged correspondingly to the lamps 21a and 21b, respectively, with reflecting surfaces thereof being orthogonal to each other and with center axes X-X of these reflection mirrors being coincide with each other.

Since the arrangement of the reflection mirrors 26a and 26b is similar to that in the first embodiment shown in FIG. 3, detailed description thereof is omitted.

An operation of the projector device according to the third embodiment of the present invention will be described with reference to FIG. 6 and FIG. 7.

Lights emitted from the lamps 21a and 21b are reflected by the reflection mirrors 22a and 22b and converted into the parallel light fluxes thereby, respectively. The parallel light fluxes are incident on the integrators 23a and 23b, respectively.

The integrators 23a and 23b compress the parallel light fluxes in height direction of the reflection mirrors 26a and 26b and average the amounts of light in center portions and peripheral portions of the incident lights, respectively. Light fluxes emitted from the integrators 23a and 23b are incident on the integrators 24a and 24b to further average the amounts of emitted lights in the center portions and the peripheral portions of the integrators 23a and 23b, respectively. Thus, the luminous intensities of the illumination light fluxes incident on the liquid crystal panels 15R, 15G and 15B are made uniform, respectively.

The light fluxes emitted from the integrators 24a and 24b are linearly polarized by the polarizers 25a and 25b such that the polarizing directions thereof coincide with the polarizing directions of the liquid crystal panels, respectively. The light fluxes from the polarizers 25a and 25b are reflected at right angle by the reflection mirrors 6a and 6b, respectively. In this case, the reflection mirrors 26a and 26b are arranged vertically as shown in FIG. 7 so that the light fluxes reflected from the reflection mirrors 26a and 26b illuminate an upper half portion and a lower half portion of the field lens 27, respectively.

Since the reflected light from the field lens 27 is divided to the upper portion and the lower portion, these light fluxes are hardly influenced by difference in incident angle between the both light portions when these light fluxes are incident on the dichroic mirrors 10 and 11, respectively. Consequently, it is possible to reduce the color variation of the color image on the screen 18.

The light flux from the field lens 27 is reflected at right angle by the reflection mirror 28a and then the reflection mirror 28b and is incident on the dichroic mirror 10. With the reflection mirrors 28a and 28b of the condenser portion 40A, the projector device can be made compact as a whole and the projection lens 17 can be arranged on a center line of the projector device.

The dichroic mirror 10 allows a red color light of an input white light to pass through and the dichroic mirror 11 reflects a green color light of a light reflected by the dichroic mirror 10 and allows a blue color light to pass through.

The red color light transmitted through the dichroic mirror 10 is reflected by the flat mirror 12a and is incident on the condenser lens 14R. The red color light condensed by the condenser lens 14R illuminates the liquid crystal panel 15R. The green color light reflected by the dichroic mirror 11 is condensed by the condenser lens 14G and illuminates the liquid crystal panel 15G. The blue color light transmitted through the dichroic mirror 11 is reflected by the flat mirror 12b and condensed by the condenser lens 13. The reflected blue color light is reflected by the flat mirror 12c, condensed by the condenser lens 14B and illuminate the liquid crystal panel 15B.

The liquid crystal panels 15R, 15G and 15B spatially modulate the red, green and blue color lights according to electric inputs, respectively, to produce an image light correspondingly to brightness of portions of the respective red, green and blue color images.

The cross dichroic prism 16 synthesizes the red, green and blue color image lights to produce a color image light, which is enlarged by the projection lens 17 and projected onto the screen 18. When the projection lens 17 has a focus regulating function, it is possible to display a well focused clear color image on the screen 18.

According to the projector device of the described embodiment, which uses two small lamps of lower power, it is possible to display an image having luminosity equal to or higher than that obtainable by using a high power large lamp.

Fourth Embodiment

Figure 8:
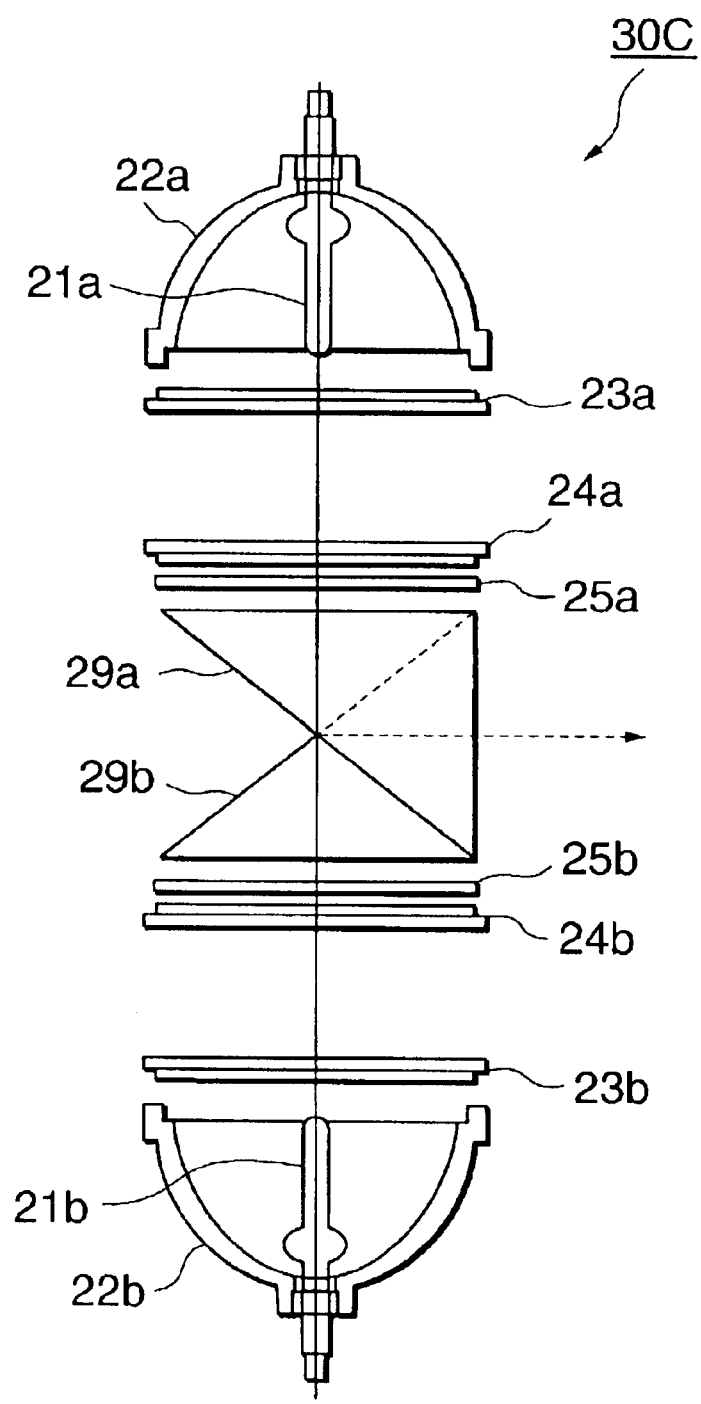
FIG. 8 shows an arrangement of light sources and reflection mirrors in a projector device according to a fourth embodiment of the present invention.
Figure 9:
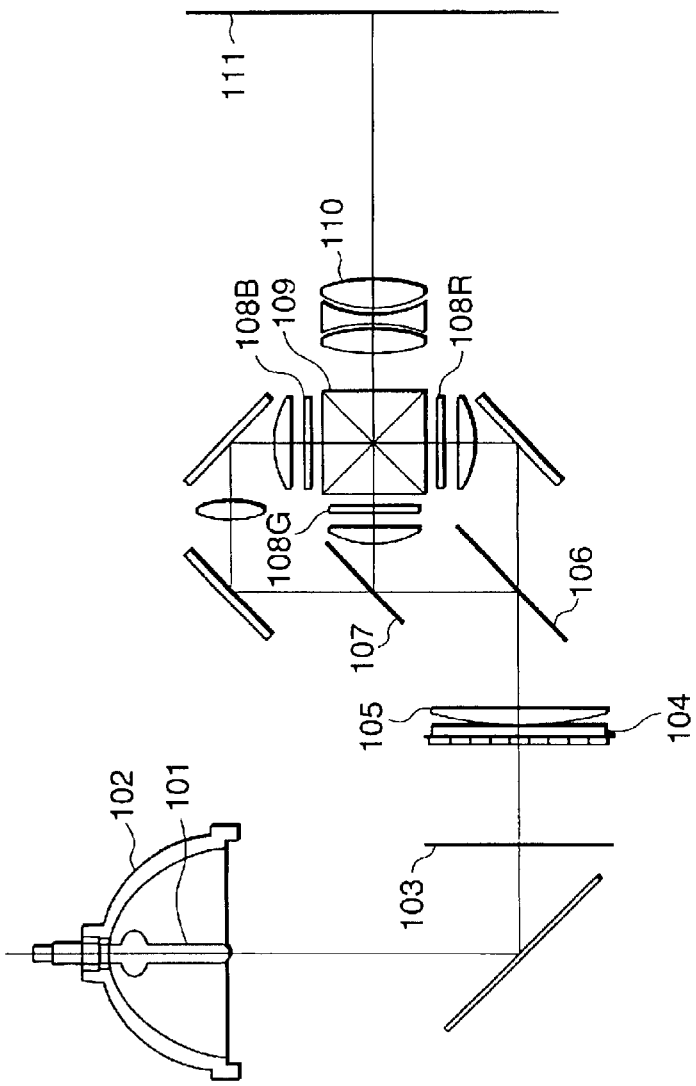
FIG. 9 shows an example of a conventional projector device using liquid crystal panels.

FIG. 8 shows an arrangement of light sources and reflection prisms in a projector device according to a fourth embodiment of the present invention.

Although only a light source portion 30C is shown in FIG. 8, other portion of the projector device according to the fourth embodiment, which includes a condenser portion 40A, an image forming portion 50 and a projection lens 17, is similar to that in the third embodiment shown in FIG. 6.

The light source portion 30C of the projector device differs from the light source portion 30B of the third embodiment shown in FIG. 6 in that reflection prisms 29a and 29b are used in lieu of the reflection mirrors 26a and 26b. Incidentally, since a portion including lamps 21a and 21b, reflection mirrors 22a and 22b, integrators 23a and 24b and a polarizer 25a and a portion including reflection mirrors 23b and 24b and a polarizer 25b are similar to those of the light source portion 30B in the third embodiment shown in FIG. 6, detailed description thereof is omitted.

In FIG. 8, the reflection prisms 29a and 29b are offset in a direction perpendicular to the drawing sheet and reflecting surfaces thereof, which make an angle of 45° thereof with respective optical axes of the lamps 21a and 21b, respectively, are orthogonal to each other. Light from the lamp 21a is incident on the reflection prism 29a, reflected by the reflecting surface thereof rightward to the condenser portion and light from the lamp 21b is incident on the reflecting surface of the reflection prism 29b and reflected thereby rightward to the condenser portion.

Since the arrangement of the reflection prisms 29a and 29b is similar to that of the reflection prisms 19a and 19b of the second embodiment shown in FIG. 5, detailed description thereof is omitted.

According to the projector device of the fourth embodiment in which the light source portion uses the reflection prisms in lieu of the reflection mirrors, it is possible to obtain a similar effect to that obtained by the first embodiment.

The preferred embodiments of the present invention have been described in detail with reference to the drawings. However, it should be noted that the present invention is not limited to these embodiments. The described embodiments can be modified within the scope of the present invention. For example, the lamps 1a and 1b and the lamps 21a and 21b are not limited to the extra-high pressure mercury lamps. These lamps may be metal halide lamps, halogen lamps or xenon lamps, etc. In order to make the size of the projection screen changeable arbitrarily without changing a projection distance, a lens having a zooming function may be used as the projection lens 17.

Further, although the case where lights from the light source portion are reflected at right angle by reflection members such as the reflection mirror or the reflection prism have been described, the right angle reflection of the light fluxes may not be indispensable requirement since it is possible to select the incident angle of the lights from the light source portion such that light fluxes from the reflection members are emitted in parallel in one direction. However, the described construction of the light source portion is practical in view of required assembling work of the optical system and hence in view of fabrication of the projector device.

Further, a preferable offset distance of the optical axes of the light sources is equal to or smaller than a diameter of the reflection mirror of the light source. It is more preferable that the offset distance is within a range from a radius of the reflection mirror to the diameter of the reflection mirror.

As described hereinbefore, according to the projector device of the present invention, it is possible to display a color image having luminance, which is at least equal to that obtainable by using a high power large lamp, with using a plurality of low power small lamps.

In this case, by the use of the small, low power lamps, it is possible to make the projector device compact. Further, the maintenance of the projector device is facilitated because an exchange of the light source portion may be performed by exchanging at least one of the small lamps.

What is claimed is:

1. A projector device comprising:
   a plurality of light sources having parallel optical axes offset;
   an optical member for compressing light fluxes emitted from the plurality of said light sources in the offset direction;
   a reflection member for reflecting the compressed light fluxes in one direction;
   a condenser portion for condensing the light fluxes reflected by said reflection member and emitting the condensed light fluxes as a single light flux;
   an image forming portion for separating the single light flux to a plurality of color lights, forming image lights having the plurality of the color lights by transmitting the separated color lights through spatial modulator elements for spatially modulating the color lights correspondingly to images of the respective colors and producing a color image light by synthesizing the image lights; and
   projection member for projecting the color image light produced by said image forming portion.

2. A projector device as claimed in claim 1, wherein said reflection member is composed of a pair of flat reflection mirrors arranged correspondingly to respective said optical axes of said light sources and having reflection surfaces orthogonal to each other, the light fluxes from said light sources being reflected by said reflection surfaces at right angle, respectively to form parallel light fluxes.

3. A projector device as claimed in claim 1, wherein said reflection member is composed of a pair of reflection prisms arranged correspondingly to respective said optical axes of said light sources and having reflection surfaces orthogonal to each other, the light fluxes from said light sources being reflected by said reflection surfaces at right angle, respectively, to form parallel light fluxes.

4. A projector device as claimed in claim 2, wherein each of said reflection mirrors is constructed with a cold mirror for reflecting visible lights and transmitting infrared light.

5. A projector device as claimed in claim 1, wherein said optical member for compressing the lights in the offset direction is constructed with a cylindrical lens.

6. A projector device as claimed in claim 1, wherein said condenser portion includes concave lenses for diverging the compressed lights from said reflection member in a direction opposite to the compressed direction and integrators for averaging amounts of light emitted from center portions and peripheral portions of said concave lenses.

7. A projector device as claimed in claim 1, wherein said optical member for compressing the lights in the offset direction has a function of integrator for averaging amounts of light emitted from center portions and peripheral portions of the lights from said light sources.

8. A projector device as claimed in claim 7, wherein a polarizer portion is provided between said optical member and said reflection member.

9. A projector device as claimed in claim 1, wherein said light sources are composed of lamps and reflection mirrors, respectively, and arranged oppositely to each other such that optical axes of said light sources become parallel to each other and said spacial modulator elements are liquid crystal panels, respectively.

10. A projector device as claimed in claim 9, wherein said lamps are ultra-high pressure mercury lamps, respectively.

11. A projector device as claimed in claim 9, wherein said projection lens constituting said projection member has a zooming function.

12. A projector device as claimed in claim 9, wherein said optical member for compressing the lights in the offset direction is constructed with cylindrical lenses, respectively, said reflection member is composed of a pair of reflection mirrors or reflection prisms arranged correspondingly to respective said optical axes of said light sources and having reflection surfaces orthogonal to each other, the light fluxes from said light sources being reflected by said reflection surfaces at right angle, respectively, to form parallel light fluxes, said condenser portion unifies polarizing directions of a plurality of incident lights to form a single emitting light including linearly polarized lights having polarizing direction coincident with polarizing directions of said liquid crystal panels and said image light forming member decomposes the light emitted from said condenser member to a red, green and blue color lights and produces a color image light by passing the decomposed color lights through said liquid crystal panels and said projection member for projecting the color image light is a projection lens.

* * * * *

UNITED STATES PATENT AND TRADEMARK OFFICE
CERTIFICATE OF CORRECTION

PATENT NO. : 6,742,898 B2
DATED : June 1, 2004
INVENTOR(S) : Eisaku Shouji

It is certified that error appears in the above-identified patent and that said Letters Patent is hereby corrected as shown below:

Column 12,
Line 66, please add the following:
   --13. A projector device as claimed in claim 9, wherein said condenser member includes a first and second integrators for unifying the lights from said light sources, compressing the lights in the offset direction and converting them into linear polarized lights coincident with the polarizing directions of said liquid crystal panels, said reflection member is composed of a pair of reflection mirrors or reflection prisms arranged correspondingly to respective said optical axes of said light sources and having reflection surfaces orthogonal to each other, the light fluxes from said light sources being reflected by said reflection surfaces at right angle, respectively, to form parallel light fluxes in one direction, said condenser portion unifies polarizing directions of a plurality of incident lights to form a single emitting light including linearly polarized lights having polarizing direction coincident with polarizing directions of said liquid crystal panels and said image light forming member decomposes the light emitted from said condenser member to a red, green and blue color lights and produces a color image light by passing the decomposed color lights through said liquid crystal panels, respectively, and said projection member for projecting the color image light is a projection lens.--

Signed and Sealed this

Fourteenth Day of June, 2005

JON W. DUDAS
*Director of the United States Patent and Trademark Office*